United States Patent [19]
Ackerley et al.

[11] Patent Number: 5,730,166
[45] Date of Patent: Mar. 24, 1998

[54] FLUID PRESSURE REDUCTION

[75] Inventors: Robert Ackerley, Kenilworth; Anthony David Raybould, Tile Hill, both of Great Britain

[73] Assignee: British Gas PLC, London, Great Britain

[21] Appl. No.: 516,926

[22] Filed: Aug. 18, 1995

[30] Foreign Application Priority Data

Sep. 9, 1994 [GB] United Kingdom ............... 9418187

[51] Int. Cl.⁶ .................................... G05D 16/02
[52] U.S. Cl. .................. 137/2; 137/14; 137/505.12; 137/599
[58] Field of Search ............... 137/599, 505.12, 137/2, 14

[56] References Cited

U.S. PATENT DOCUMENTS

| | | | |
|---|---|---|---|
| 2,694,407 | 11/1954 | Jobson | 137/505.12 X |
| 4,858,640 | 8/1989 | Kaufmann | 137/236.1 |

FOREIGN PATENT DOCUMENTS

| | | |
|---|---|---|
| 0 266 731 | 5/1988 | European Pat. Off. . |
| 2 345 689 | 3/1974 | Germany . |
| 27 39 657 | 3/1978 | Germany . |
| 1 312 336 | 4/1973 | United Kingdom . |
| 1 387 345 | 3/1975 | United Kingdom . |
| 2 217 877 | 11/1989 | United Kingdom . |
| 2 252 848 | 8/1992 | United Kingdom . |

*Primary Examiner*—Stephen M. Hepperle
*Attorney, Agent, or Firm*—Oblon, Spivak, McClelland, Maier & Neustadt, P.C.

[57] ABSTRACT

A fluid pressure reduction system includes at least two streams. A working stream includes valves with associated pressure sensors for modulating output pressure. A control system monitors pressure via a sensor and actuates a slam shut valve in the event of a fault. In the event that another stream is at fault the arrangement allows the slam shut valve to be opened. In the faulty stream only, pressure again rises, the slam shut is again shut and cannot be reopened until manually reset following fault clearance. Independent control in each stream assists in system integrity. All streams can close and reopen once. The second closure determines the faulty stream.

12 Claims, 3 Drawing Sheets

FLUID PRESSURE REDUCTION

BACKGROUND OF THE INVENTION

Field of the Invention

The invention relates to fluid pressure reduction and monitoring. In gas reduction systems for example there is a need to monitor the reduced pressure output to ensure no faults occur.

According to the invention there is provided a fluid pressure reduction system including a plurality of streams selectable as a working stream, means for monitoring pressure in the stream to determine the possible presence of a fault in that stream, closure means operable to isolate the stream and means for automatically opening the closure means as part of the fault determination to avoid isolation of a stream having no fault therein.

Further according to the invention there is provided a system for determining faults in a fluid reduction system having a plurality of operable streams including means for determining fluid pressure in a stream, means for activating an isolation device in the event of a pressure rise and means for deactivating the isolation device to determine whether the pressure rise is due to a fault in that stream, and wherein the means for activating and deactivating the isolation device is provided as an independent control mechanism in each stream for system integrity.

Further according to the invention there is provided a method for determining faults in a fluid reduction system having a plurality of streams, the method including the steps of: monitoring fluid pressure in a stream, activating an isolation device in the event of a pressure rise and deactivating the isolation device to determine whether the pressure rise is due to a fault in that stream.

BRIEF DESCRIPTION OF THE DRAWINGS

The invention will now be described by way of example with reference to the accompanying drawings in which.

DESCRIPTION OF THE PREFERRED EMBODIMENTS

Figure 1:
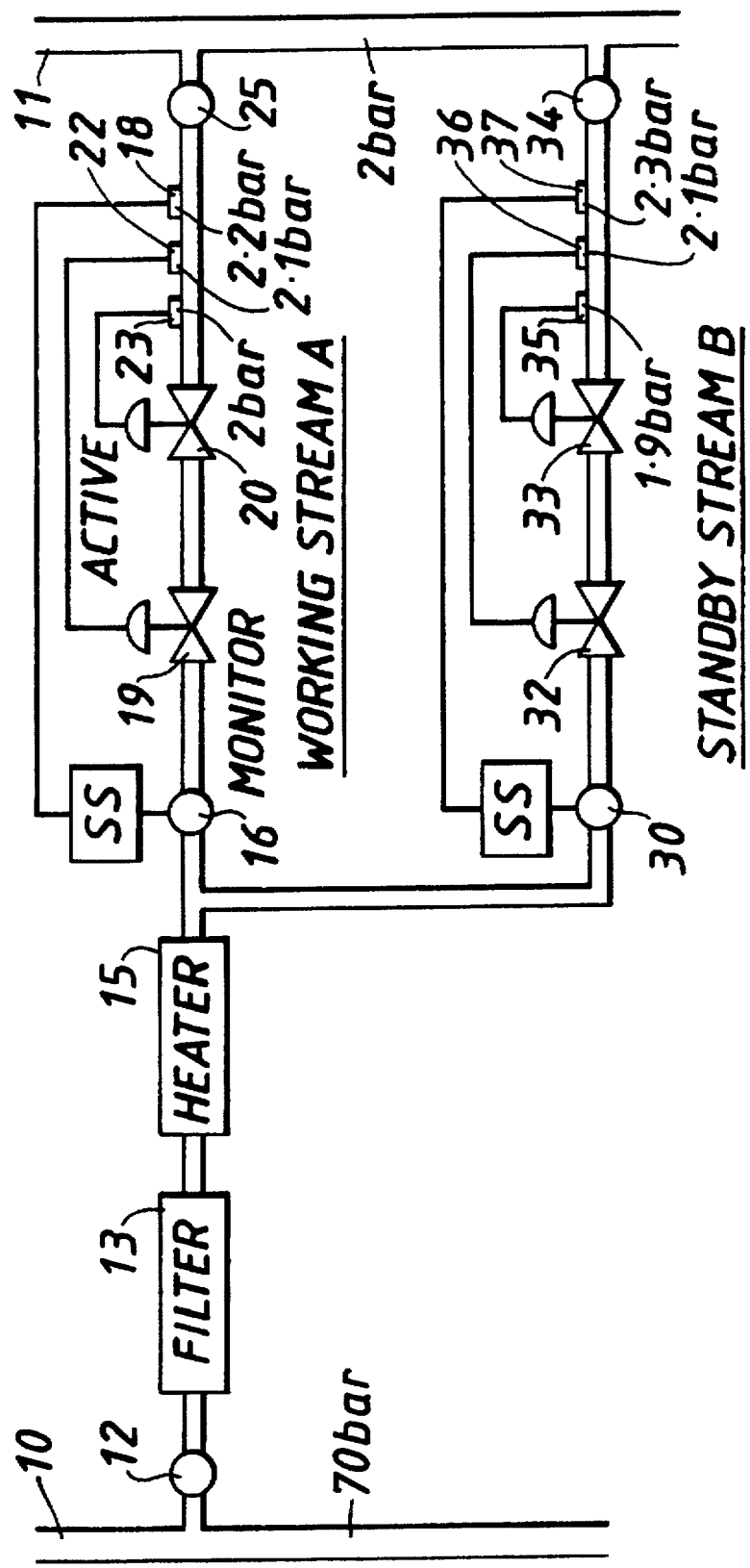
FIG. 1 shows a pressure reduction system with a working and standby stream and monitoring arrangements therefor.

FIG. 1 shows a pressure reduction station which handles high pressure gas (e.g. 70 bar) received at pipeline 10 and produces a low pressure output (e.g. 2 bar) to pipeline 11 for eventual use by the consumer. The gas passes via manually controllable valve 12 through filter 13 which removes stray particles and then to heater 15. The heater 15 is necessary to compensate for cooling effects resulting from pressure reduction. The gas then passes through either a working stream or a standby stream, but normally through the working stream.

In the working stream the gas passes through a slam shut valve 16 operable into the shut position as a result of pressure detected by sensor 18 as described below. The slam shut is a safety device which must be manually re-opened if the safety valve closes. The stream through the open slam shut then passes through 'monitor' valve 19 and 'active' valve 20 each having a respective pressure sensor 22 and 23.

A final valve 25 which is manually operable is also provided prior to the outlet pipeline 11.

The standby stream duplicates the working stream and includes valves 30–34 and associated sensors 35–37. In practice the pressure sensors in the standby stream are set to different values for reasons now described.

The working stream sensors 23, 22 and 18 are set to 2, 2.1 and 2.2 bar respectively. The aim is to provide pressure at 2 bar and this is achieved by active valve 20 which will open and close as the 2 bar value drops or is reached so this valve modulates to provide a constant 2 bar output. As the monitor valve 19 is set to 2.1 bar this will normally remain open at all times. However, if the active valve 19 becomes faulty and locked open then pressure would rise. This will be detected by sensor 22 and valve 20 will take over the modulation to provide an output of 2.1 bar, so that supply is maintained (but an indicator can be operated to show the active value 20 is faulty, if desired). In the unlikely event that both valves lock in the open position the pressure will rapidly rise to 2.2 bar at which point the slam shut valve 16 will activate to turn off the supply to the working stream.

The standby stream will then come into play. Normally, because active valve 33 will be set to a pressure of 1.9 (and the pressure in the working stream is normally 2.0) it will always be shut—i.e. trying to reduce the pressure to 1.9. However, when the working stream is shut down the active valve will be able to achieve this pressure value of 1.9 and so will modulate about this point.

If valve 33 was to lock into the open position, then monitor valve 32 would begin to operate and maintain pressure at 2.1 bar. A pressure rise due to a fault when this valve remains fully open will cause slam shut 30 to operate at 2.3 bar. This would effectively shut down the whole pressure reduction system as the working stream is also shut. The valves in such a system typically operate pneumatically.

In practice because working stream A (beyond active valve 20) is in effect connected to standby stream B up to valve 33 via pipeline 11 and therefore any gas pressure level in pipeline 11 will be present in both streams and detectable by sensors 18 and 37. Because of this, it is possible that a fault in stream B due to faults in valves 32 and 33 remaining open will cause a pressure rise and be detected by sensor 18 causing slam shut 16 to operate. However, because the fault is in standby stream B the pressure will continue to rise and cause slam shut 30 to operate thus shutting down the entire system even though there is no fault in the working stream A.

As either stream could be the failed stream such an arrangement could result in both streams being shut down.

Figure 2:
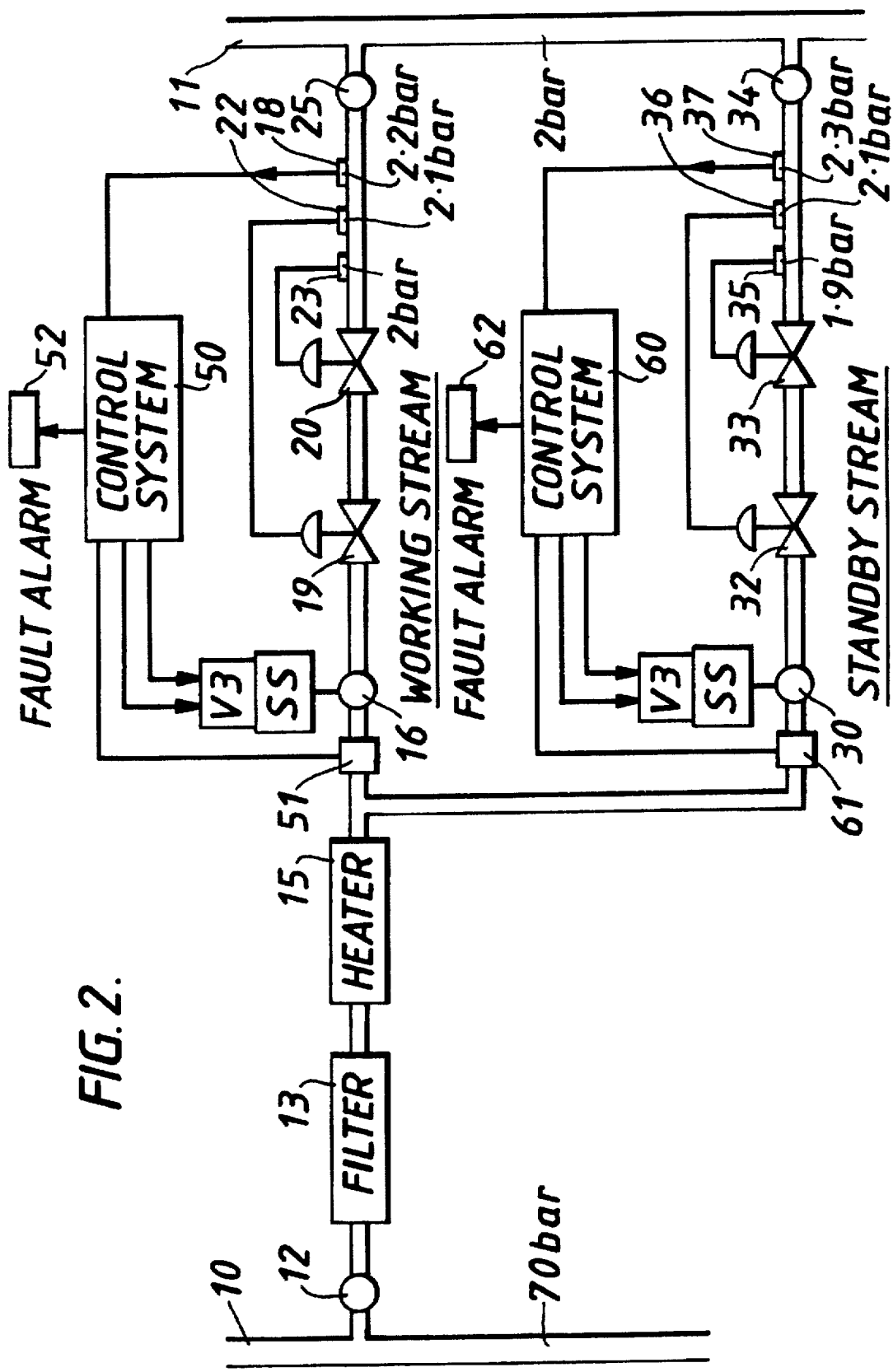
FIG. 2 shows an improved system where independent controllers are provided in each stream to allow reopening of selected valves.

A modification as shown in FIG. 2 is now utilized to provide independent control in each stream.

In the modified system the arrangement includes a dedicated control system in each stream.

The control system 50 in the working stream receives the pressure information from sensor 18. The pressure output (80 psig) from a regulator 51 is used by control 50 to power actuator V3 associated with the slam shut 16.

A corresponding arrangement in the standby stream includes control system 60 and regulator 61.

The arrangement allows intelligent independent control of the slam shut in each stream using two dedicated control systems. If a fault is sensed the arrangement allows for the slam shuts to be opened once (non-manually) in case the fault is in the alternate stream and without having to have any linked control between the streams for the sake of integrity.

In the event of a fault in the system (for example regulators 19 and 20 failed open in the working stream) there will be a rise in outlet pressure. This will be sensed via sensor 18 and the control system will cause valve V3 to actuate the slam shut 16 into the closed position at 2.2 bar. The output pressure will fall (due to isolation of faulty regulators 19 and 20). When this pressure falls below 2.2 bar, control system 50 allows slam shut 16 to open briefly using valve V3 until the pressure rises again above 2.2 bar causing slam shut 16 to close again so isolating the fault, and notifying the fault via alarm 52. Control system 50 prevents the slam shut opening again.

The independent control system 60 is monitoring pressure from the sensor 37 to determine if it rises above 2.3 bar. As the fault has been isolated in the working stream in fact the pressure continues to fall and at 2.1 bar regulator 32 opens, but as regulator 33 is still closed, the output pressure continues to fall. However, when 1.9 bar is reached regulator 33, as determined by sensor 35, will open and regulated supply is restored using the standby stream to handle the gas supply to pipeline 11.

In the event that the fault had been in the standby stream, the closing of the slam shut 16 in the working stream would have identified that this did not cure the fault in that stream, so it would have remained closed until the fault was isolated. The fault in the standby stream (assuming regulators 32 and 33 have failed open) would be detected by the independent control system 60. This would cause the following events to happen.

At 2.2 bar slam shut 16 (working stream) closes but output pressure continues to rise as the fault is not isolated. At 2.3 bar slam shut 30 (standby stream) closes isolating the fault and the output pressure falls. When this is below 2.3 bar slam shut 30 opens but the fault is restored causing slam shut to close again under the control of system 60 and fault alarm 62 activated.

When the pressure falls below 2.2 bar slam shut 16 (working stream) opens but the pressure continues to fall (as the fault is isolated in the standby stream). When 2.1 bar is reached, regulator 19 opens and when 2.0 bar is reached regulator 20 opens and supply downstream is once again available. Hence the system is intelligent enough to determine which stream is faulty even though there is no common sensing shared by the streams. Only in the exceptional case of both streams being faulty will both streams be shut down.

Figure 3:
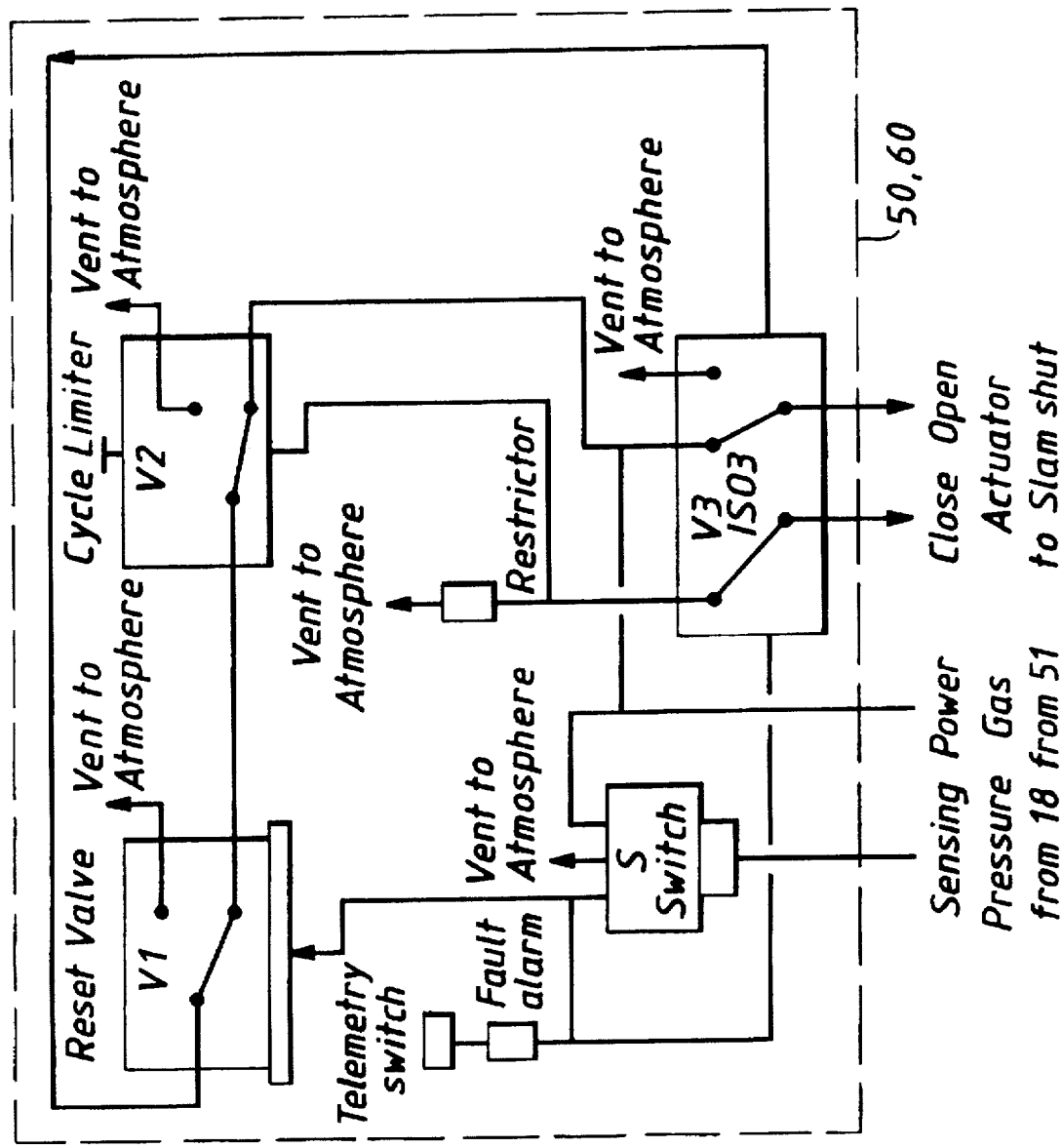
FIG. 3 shows an arrangement for each independent controller.

A suitable arrangement for the control system 50 or 60 is shown in FIG. 3.

The arrangement includes a switch S, and valves V1 to V3. In practice V3 is shown already in FIG. 2.

A. The 80 psig pressure is fed to the close pilot port of the ISO3 valve V3 (see FIG. 3). The outlet of the pneumatic switch is also connected to a reset valve V1. Switching over the reset valve vents the open pilot port of V3, thus causing it to change position and feed power gas to the close side and vent the open side of the actuator. The slam shut valve therefore closes.

B. With the slam shut valve closed the outlet pressure decays due to demand. When this drops below the reset level of the pneumatic switch, it resets and vents the close pilot port of V3. At the same time the reset switch operates under spring pressure and powers the open pilot port of V3.

This causes V3 to change position and feed power gas to the open side and vent the close side of the actuator. The slam shut valve therefore opens.

Venting the close side of the actuator also operates the cycle limiting valve V2 and vents the open pilot port of V3.

C. Outlet pressure will now rise again causing the pressure switch to operate and initiate the sequence described under paragraph A.

The slam shut valve is now closed for the second and final time.

D. Further decay in outlet pressure will again operate the pressure switch and initiate the sequence as described in paragraph B, except this time the reset switch cannot power V3 because the power has been isolated at V2.

The slam shut valve will now remain closed until the cycle limiting valve is manually reset. This sequence of events ensures that only the faulty stream on a station is isolated.

If there is a single spurious high pressure event in the system which rapidly disappears, the system checks will ensure that permanent shut off is avoided.

Fault signals can be sent to a remote central control for example via a radio link, if the station is unmanned using the telemetry switch operable on alarm detection.

Although the system has been described with two streams, by providing three control systems, three streams could be handled, and so on.

We claim:

1. A fluid pressure reduction system comprising:
   a plurality of streams selectable as a working stream;
   means in each of the streams for monitoring pressure in an associated stream to determine a presence of a fault in at least one of the streams;
   closure means operable to isolate the at least one stream; and
   means in each of the streams for automatically opening the closure means as part of a fault determination to avoid isolation of a stream of said streams having no fault therein.

2. A system as claimed in claim 1, wherein the closure means for isolating the at least one stream and the means for automatically opening the closure means are provided as an independent control mechanism in each of the streams.

3. A system as claimed in claim 1 or 2, wherein the means for automatically opening the closure means is present in each of the plurality of streams to allow a brief opening of the closure means as part of the fault determination in the at least one stream.

4. A system as claimed in claim 1, wherein each of the streams includes a plurality of series connected valves and sensors associated therewith to activate or modulate the valves to control an output pressure from each of the streams.

5. A system as claimed in claim 4, wherein the means for monitoring pressure is selected to be operable at a pressure above a pressure associated with the valves.

6. A system as claimed in claim 1, wherein indicator means are provided for activation when a fault in the at least one stream is confirmed following automatic opening of the closure means as part of the fault determination, and means are provided to again activate the closure means.

7. A system as claimed in claim 6, wherein reset means are provided to open the at least one stream after any fault has been rectified.

8. A system for determining faults in a fluid reduction system having a plurality of operable streams, the system including:
   means for determining fluid pressure in an associated stream;
   means in each of the streams for activating an isolation device upon a pressure rise; and means in each of the streams for deactivating the isolation device to determine whether the pressure rise is due to a fault in at least one of the streams, wherein the means for activating and the means for deactivating the isolation device are provided as an automatic independent control mechanism in each of the streams for system integrity.

9. A system as claimed in claim 8, wherein the means for activating the isolation device and the means for deactivating the isolation device are provided as an automatic independent control mechanism for each of the streams to allow a brief opening of the isolation device as part of the fault determination in each of the streams.

10. A system as claimed in claim 8 or 9, wherein indicator means are provided for actuation when a fault in the at least one stream is confirmed following deactivating the isolation device, and the activating means are provided to again activate the isolation device.

11. A method for determining faults in a fluid reduction system having a plurality of streams, the method including the steps of:

monitoring fluid pressure in each of the streams, automatically activating an isolation device upon a pressure rise, and briefly automatically deactivating the isolation device to determine whether the pressure rise is due to a fault in each one of the streams.

12. A method as claimed in claim 11, including the further step of activating the isolation device once again if the pressure rise is again detected after the brief deactivating step.

* * * * *